United States Patent [19]

Hensley et al.

[11] Patent Number: 4,774,009
[45] Date of Patent: Sep. 27, 1988

[54] METHOD FOR DEWATERING CORN WET MILLING PRODUCTS

[75] Inventors: Kenneth Hensley, Hammond, Ind.; Stewart McDaniel, Palatine, Ill.; Charles Bates, Crown Point, Ind.

[73] Assignee: American Maize-Products Company, Stamford, Conn.

[21] Appl. No.: 98,477

[22] Filed: Sep. 18, 1987

[51] Int. Cl.⁴ .............................................. B01D 25/12
[52] U.S. Cl. ...................................... 210/780; 210/793; 210/805; 210/225; 127/40; 127/42; 127/55
[58] Field of Search ...................... 127/321, 39, 40, 55, 127/65, 42; 210/741, 767, 780, 793, 794, 805, 225, 231

[56] References Cited

U.S. PATENT DOCUMENTS

| | | | |
|---|---|---|---|
| 4,057,437 | 11/1977 | Kracklauen | 127/55 X |
| 4,317,734 | 3/1982 | Kurita | 210/780 |
| 4,427,552 | 1/1984 | Liberhen et al. | 210/780 X |

Primary Examiner—Charles Hart
Attorney, Agent, or Firm—Lucas & Just

[57] ABSTRACT

A method for dewatering slurry product streams of a corn wet milling process is disclosed. The dewatering process uses an automatic pressure filter to perform the dewatering. The filter is operated at 4 to 20 bars pressure for about 5 to 25 minutes. Such filter is shown to have an improved efficiency over conventional mechanical filtering devices.

8 Claims, 1 Drawing Sheet

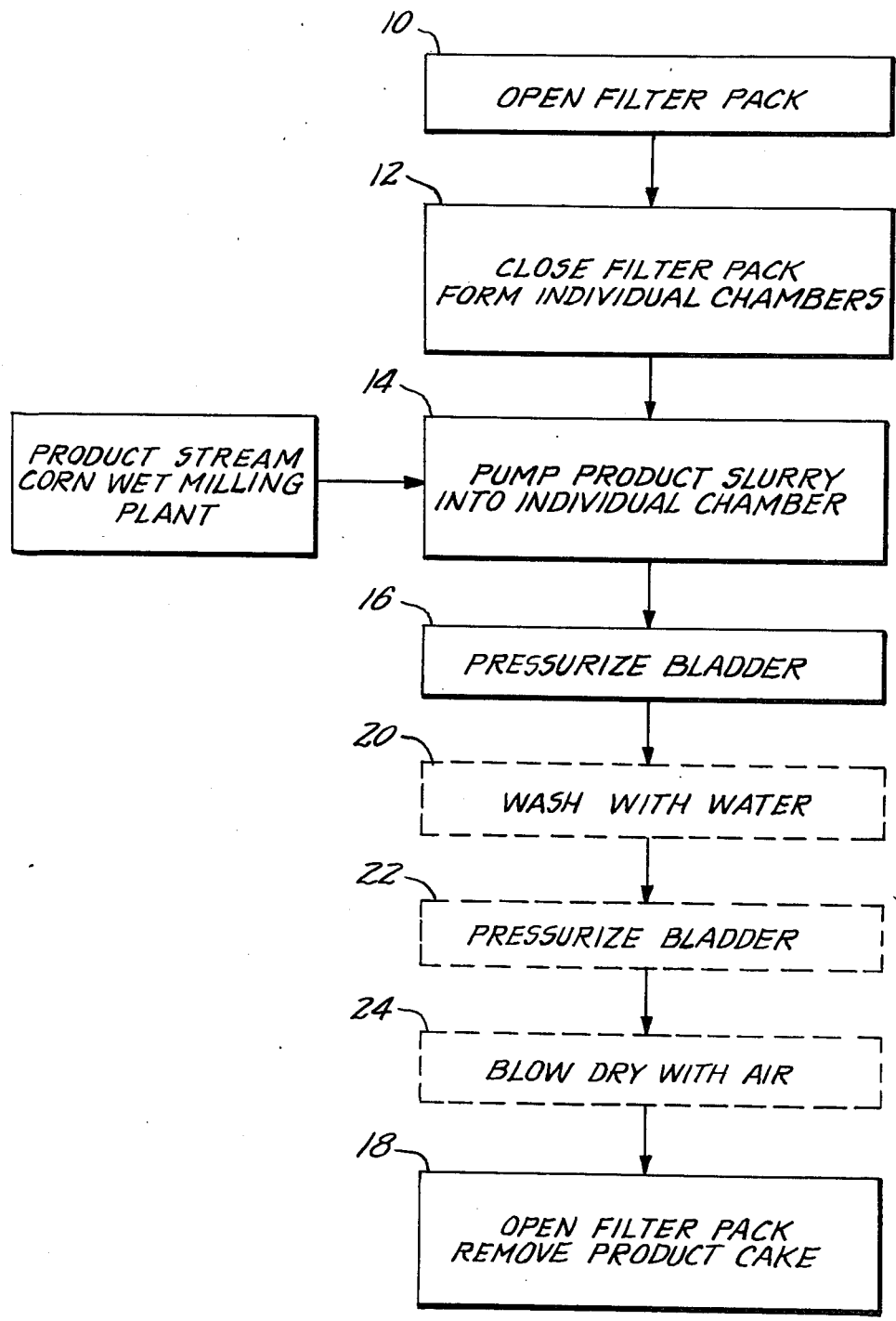

METHOD FOR DEWATERING CORN WET MILLING PRODUCTS

This invention relates to a method for dewatering slurry product streams produced from a corn wet milling process, and more particularly, a method for dewatering slurry product streams containing gluten, starch and bran using an automatic pressure filter.

The wet milling of corn is a solid-liquid separation where dry corn kernels are steeped in water and then separated into their various components of germ, gluten, starch and bran. Bran is a term used to denote fiber and hull. First, the kernel is steeped in warm water which softens the kernel and allows the germ to be separated from the rest of the components after a preliminary grind. Next, the kernel is subject to further grinding and separation techniques that separate the gluten and starch from the bran. Finally, the starch is separated from the gluten.

After each component is separated, they are subject to a dewatering and drying process. Generally, dewatering of bran is carried out in a conventional mechanical press while gluten is dewatered on a rotary vacuum drum filter. Starch is dewatered in a basket centrifuge or rotary vacuum drum filter, mostly on a basket centrifuge.

These mechanical dewatering processes only remove a small portion of the water from the product stream. The drying process, which is carried out with heat generating apparatuses, removes the majority of the remaining water from the product streams by evaporation. Typically, flash drying is used to drive off the remaining water.

The dewatering and drying process is very demanding on energy and tie the expense of corn wet milling to the price of energy. There is a need for a more economic and efficient method for removing water from the slurry product streams of a corn wet milling process.

A more efficient and economic process for removing water from corn wet milling product streams has now been discovered. Broadly, the present invention dewaters the slurry product streams of a corn wet milling process by subjecting the product slurries to an automatic pressure filter, thereby removing a majority of the water from the product slurries.

It is truly unexpected that a mechanical filter is capable of removing enough water from the product slurries to make such a process practical. Additionally, the automatic pressure filter takes less energy than a dryer to remove the same amount of water and thus results in an energy saving to the user.

Another advantage of the present invention is that fewer black specks appear in the finished dried product. Black specks in the dried product are burnt product. The burning occurs when the product contacts the hot sides of the drying equipment. The present invention permits operating drying equipment at less severe conditions; thus, the product is not so subject to burning. Fewer black specks produces a more acceptable product.

Although water is a fairly inexpensive component in the corn wet milling process, there exists a problem with disposal of waste water from the process. Generally, the waste water is not recycled because it contains suspended solids which prevents the waste water from being recycled.

Another advantage of the present invention is that filtrate from the automatic pressure filter is virtually free of suspended solids. Thus, the filtrate is capable of being recycled to the steeping stage or other points in the corn wet milling process. The recycling of the filtrate from the automatic pressure filter back to the wet milling process saves both water expense and waste disposal expense. This is a definite advantage.

Yet another advantage of the present invention is that the process is insensitive to change in feed rate and solids content in the slurry. Solids content and feed rate are very important factors in the use of conventional pieces of dewatering equipment in the corn wet milling industry.

The process of the present invention subjects the corn wet milling slurry product streams to an automatic pressure filter to remove the water therefrom. More specifically, starch, gluten and bran product slurries are dewatered and waste water is purified for recycling by subjecting the product slurries and sludge from the process to an automatic pressure filter.

An automatic pressure filter is a technological improvement of the conventional and widely used filtration equipment known as plate and frame filter press. Automatic pressure filters are mechanical pieces of equipment used in processing mine ores. An automatic pressure filter comprises a frame made up of multiple leaves. Each leaf has one side which is a bladder while the other side is a filter cloth. By closing the leaves, filter chambers are formed between each successive leaf. The bladder of one leaf works against the filter cloth of an adjacent leaf to perform the filtration operation. It is truly surprising that a piece of mechanical equipment used in processing mine ores is applicable in a corn wet milling process. Suitable automatic pressure filters are sold under the trademark LAROX by Larox Oy, P.O. Box 29, 53101 Lappeenranta 10, Finland. An automatic pressure filter has multiple chambers which apply pneumatic pressure in the form of an expanded bladder against a slurry to dewater the slurry. Preferably a pneumatic pressure of about 4 to about 20 bars is used and more preferred about 8 to about 16 bars. Preferably this pressure is applied for about 5 to about 25 minutes and more preferred about 10 to about 20.

FIG. 1 is a flow diagram of the steps performed in a preferred embodiment of the present invention.

Turning to the preferred embodiment of the present invention as illustrated in FIG. 1, the filter pack of the automatic pressure filter is started in an open position 10. Next, the filter pack is closed causing the individual filter chambers to be formed and the filter pack is locked into the closed position to seal the individual filter chambers 12. Next, the slurry is pumped into the inlet distributor which simultaneously fills the individual filter chambers 14. Once the chambers are filled with solids, pumping of the slurry ceases and air is pumped into the bladder 16. Each leaf of the filter is equipped with a rubberized bladder. The bladder is pumped to between about 8 to about 16 bars and this pressure is maintained against the cake for about 5 to about 25 minutes. The pressure of the bladder causes a majority of the water to be removed from the slurry. Next, the filter pack is opened such that each individual filter chamber is opened and the product cake is removed 18. The drying cycle can then begin again.

Optionally, prior to opening the filter pack, the filter cake can be washed by introducing wash water into the filter chamber through the inlet distributor 20. The wash water fills the space between the product cake and the bladder. This washing allows for some of the soluble chemicals which are contained in the product cake to be removed. After washing, the bladder is again pressurized to between about 8 to about 16 bars for about 5 to about 25 minutes to remove the water 22.

Also, optionally, after the bladder has squeezed the product slurry to form a product cake, dry air is blown into the filter chamber through the inlet distributor 24. The dry air fills the space between the cake and the bladder. The dry air helps to dry the product cake. Preferably the air is blown in at a rate of about 8.4 to about 10.0 cubic feet per minute (CFM) per ft.$^2$ of filter area for about 1 to about 5 minutes and good commercial results occur when the rate of air feed is about 8.8 to about 9.6 CFM per ft.$^2$ of filter area for about 1 minute.

These and other aspects of the present invention may be further understood by reference to the following examples which illustrate several preferred embodiments.

EXAMPLE 1

This example illustrates the use of an automatic pressure filter in accordance with the present invention as compared to a rotary vacuum drum filter.

A slurry containing gluten having a 13% solids concentration was taken directly from a commercial corn wet milling process and divided into two parts. One part was fed to an automatic pressure filter; the other part was fed to a rotary vacuum drum filter. The rotary vacuum drum filter was manufactured by Filtration Engineers, Div. of American Machine Metals, and operated at a pressure of 6 psi absolute at a drum speed of about 0.125 r.p.m. (8 min/revolution) and a residence time of about 5-6 minutes. This rotary vacuum drum filter was operated in a conventional manner.

The automatic pressure filter used in this example was a Larox CF 2.5 Automatic Chamber Filter used in a conventional manner. The chamber starts in an open position with the cloth bar in the down position. The cycle begins by raising the cloth bar and closing the chamber plates after the cloth is in the up position. Once the chamber is closed, slurry is pumped into the chamber through a feed port located at the bottom of the chamber. The chamber is completely filled, which causes some filtrate to be filtered out. Then, the feed port is closed and the diaphragm, rubber bladder, is subject to a pressure of 8 or 16 bars, as shown in Table 1 below, which compresses the slurry and causes additional filtrate to be removed. After this cycle, dry air is blown over the filter cake for one minute to further dry the cake. Next, the chamber is opened and the cloth moves through the chamber causing the filter cake to be removed from the chamber.

The results of these tests are shown in Table I below:

TABLE I

| Slurry/chamber | Present Invention | | | | Cake |
|---|---|---|---|---|---|
| | Bladder | | Dry Air | | |
| Initial (lb) | Pressure (Bar) | Time (Min) | Flow (CFM) | Time (Min) | Percent Solid |
| 184 | 12 | 10 | 230 | 1 | 54 |
| 202 | 12 | 16 | 240 | 1 | 55 |
| 200 | 12 | 12 | 230 | 1 | 56 |
| 172 | 12 | 14 | 230 | 1 | 52 |
| 214 | 16 | 10 | 240 | 1 | 57 |
| 247 | 16 | 12 | 250 | 1 | 58 |

TABLE I-continued

| Slurry/chamber | Present Invention | | | | Cake |
|---|---|---|---|---|---|
| | Bladder | | Dry Air | | |
| Initial (lb) | Pressure (Bar) | Time (Min) | Flow (CFM) | Time (Min) | Percent Solid |
| 216 | 16 | 14 | 240 | 1 | 53 |

The gluten cake obtained from the rotary vacuum drum filter had a solids content of 32 to 36%. This shows a 20% increase in the amount of water removed by means of the present invention as compared to the prior processes.

It is truly surprising that such a large improvement was found in using the automatic pressure filter in accordance with the present invention. It was noted that the slurry was taken directly from a commercial operation without an intermediate step. This makes the use of the automatic pressure filter for dewatering a slurry in the corn wet milling industry extremely practical and economical. It was also noted that the filtrate taken from the automatic pressure filter had virtually no suspended solids, thus, it was suitable for recycling back to the steeping step.

Yet another improvement noted during the operation of the automatic pressure filter in accordance with the present invention is that no cloth washing was required. Conventional operation of an automatic pressure filter uses a wash cycle to remove solids left on the filter cloth after the filtering operation. It is truly surprising that no wash cycle was needed. This speeds the filtration process and decreases the cost of operation.

Rotary vacuum filters periodically have problems with filtration rates and more specifically with rotary vacuum filter cloth picking up gluten cake. This problem is alleviated by using an automatic pressure filter as shown in this example wherein the press used in accordance with the present invention was able to handle variable amounts of slurry to the chambers. See Table 1 above.

EXAMPLE 2

This example illustrates the improved dewatering method of the present invention compared to a conventional centrifuge. The procedure of example 1 was used, except that a conventional centrifuge was used in place of the rotary vacuum drum dryer. The centrifuge was a screw centrifuge with a solid bowl manufactured by Sharples.

The centrifuge was operated in a conventional manner. The gluten cake from the centrifuge has a solids content of 30% by weight, while the gluten cake from the present invention has a solids content of 55%. This again shows the superior results obtained with an automatic pressure filter used in accordance with the present invention.

EXAMPLE 3

This example illustrates the purity of the filtrate from the automatic pressure filter used in accordance with the present invention.

After treating a slurry of gluten with an automatic pressure filter in accordance with the present invention, it was found to contain 162 parts per million of suspended solids. Such a low number is considered adequate for recycling to the wet milling process.

Such is truly surprising and unexpected in light of conventional mechanical processes, which normally result in about 5,000 parts per million of suspended solids.

EXAMPLE 4

This example illustrates the amount of soluble chemicals removed from filter cake when the step of washing is employed in accordance with the present invention.

A sample of starch cake was taken prior to the washing step and after washing the slurry once, step 20. The cake contained both sodium chloride and sodium sulfate. It was found that 80% of the salts, sodium chloride, sodium sulfate contained within the cake were removed due to a wash step at 20.

Such is truly surprising and unexpected in light of conventional mechanical processes.

It will be appreciated by those of skill in the art that hydraulic pressure can be used instead of gas pressure in the bladders of an automatic pressure filter.

It will be understood that this patent is intended to cover all changes and modif of the preferred embodiments of the invention herein chosen for the purpose of illustration, which do not constitute a departure from the spirit and scope of the invention.

What is claimed is:

1. A method for dewatering a product slurry obtained from a corn wet milling process comprising: the steps of feeding said product slurry from a corn wet milling process to an automatic pressure filter; dewatering said slurry with said filter; and recovering from said filter a dewatered solid cake.

2. The method of claim 1 wherein said filter is operated with a pressure of about 8 to about 16 bars to dewater said slurry.

3. The method of claim 1 wherein the product slurry contains mainly gluten.

4. The method of claim 1 wherein the product slurry contains mainly starch.

5. The method of claim 1 wherein the product slurry contains mainly bran.

6. The method of claim 1 further comprising the step of recycling water obtained from said filter after the dewatering step to said corn wet milling process.

7. A method for purifying a sludge stream produced in a corn wet milling process comprising:
   (a) feeding said sludge stream to an automatic pressure filter;
   (b) filtering said sludge stream with said filter to remove water therefrom; and
   (c) recovering a dewatered sludge from said filter.

8. The process of claim 7 further comprising the step of recycling said water obtained from the filtering step to the corn wet milling process.

* * * * *